United States Patent
Marum et al.

(10) Patent No.: US 9,965,380 B2
(45) Date of Patent: May 8, 2018

(54) AUTOMATED TEST RUNS IN AN INTEGRATED DEVELOPMENT ENVIRONMENT SYSTEM AND METHOD

(71) Applicant: International Business Machines Corporation, Armonk, NY (US)

(72) Inventors: Matthew G. Marum, Cary, NC (US); Samuel G. Padgett, Raleigh, NC (US); Steven K. Speicher, Holly Springs, NC (US); Michael J. Tabb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 14/044,150

(22) Filed: Oct. 2, 2013

(65) Prior Publication Data
US 2015/0095884 A1    Apr. 2, 2015

(51) Int. Cl.
*G06F 9/44* (2006.01)
*G06F 11/36* (2006.01)

(52) U.S. Cl.
CPC .................. *G06F 11/3688* (2013.01)

(58) Field of Classification Search
CPC ........................................ G06F 9/44
USPC .................. 717/110–113, 124–127
See application file for complete search history.

(56) References Cited

U.S. PATENT DOCUMENTS

| | | | | |
|---|---|---|---|---|
| 5,703,788 A | * | 12/1997 | Shei | G06F 17/5022 714/E11.145 |
| 5,956,513 A | * | 9/1999 | McLain, Jr. | G06F 8/71 717/142 |
| 6,536,036 B1 | * | 3/2003 | Pavela | G06F 11/3676 707/999.104 |
| 7,165,074 B2 | * | 1/2007 | Avvari | G06F 11/3676 707/999.01 |
| 7,478,367 B2 | * | 1/2009 | Morgan et al. | 717/124 |
| 7,681,180 B2 | * | 3/2010 | de Halleux et al. | 717/124 |
| 8,146,059 B2 | * | 3/2012 | Ponsford et al. | 717/124 |
| 8,276,118 B2 | | 9/2012 | Chapman et al. | |
| 2003/0093716 A1 | * | 5/2003 | Farchi | G06F 11/3676 714/34 |
| 2003/0131337 A1 | * | 7/2003 | Perumainar | 717/100 |
| 2005/0223361 A1 | * | 10/2005 | Belbute | G06F 11/3688 717/124 |

(Continued)

OTHER PUBLICATIONS

Adrien Thebo, "Verifying Puppet: Checking Syntax and Writing Automated Tests" [online], Jan. 2012, [retrieved from Internet], [retrieved on Mar. 4, 2015], <http://puppetlabs.com/blog/verifying-puppet-checking-syntax-and-writing-automated-tests>.*

(Continued)

*Primary Examiner* — Jae Jeon
(74) *Attorney, Agent, or Firm* — Brian J. Colandreo, Esq.; Jeffrey T. Placker, Esq.; Holland & Knight LLP

(57) ABSTRACT

A method, computer program product, and computer system for editing code, by a computing device, via an integrated development environment. The code is determined to be syntactically valid. While editing the code, a subset of automated tests associated with the code is executed in response to determining that the code is syntactically valid. It is determined whether at least one automated test error is detected. The at least one automated test error is reported.

14 Claims, 6 Drawing Sheets

(56) References Cited

U.S. PATENT DOCUMENTS

| | | | | |
|---|---|---|---|---|
| 2005/0229154 | A1* | 10/2005 | Hiew | G06F 8/34 717/110 |
| 2006/0156286 | A1* | 7/2006 | Morgan | G06F 8/51 717/124 |
| 2007/0294579 | A1* | 12/2007 | Fay | G06F 11/26 714/30 |
| 2008/0126867 | A1* | 5/2008 | Pandarinathan | G06F 11/3688 714/37 |
| 2008/0250325 | A1 | 10/2008 | Feigenbaum et al. | |
| 2008/0270992 | A1* | 10/2008 | Georgieva et al. | 717/127 |
| 2010/0050154 | A1* | 2/2010 | Balasubramanian | G06F 8/33 717/113 |
| 2010/0325687 | A1* | 12/2010 | Iverson | G06F 21/41 726/1 |
| 2011/0054643 | A1* | 3/2011 | Law | G05B 23/0256 700/79 |
| 2011/0066894 | A1* | 3/2011 | Berlyant et al. | 714/38.1 |
| 2011/0145793 | A1* | 6/2011 | Alexander | G06F 11/3676 717/124 |
| 2011/0214106 | A1 | 9/2011 | Qi et al. | |
| 2012/0089964 | A1* | 4/2012 | Sawano | G06F 11/3684 717/124 |
| 2013/0081005 | A1* | 3/2013 | Gounares | G06F 9/5016 717/148 |
| 2014/0109061 | A1* | 4/2014 | Gibbens | G06F 11/3688 717/126 |
| 2014/0109063 | A1* | 4/2014 | Schissel | G06F 11/368 717/127 |
| 2014/0180961 | A1* | 6/2014 | Hankins | G06Q 10/10 705/348 |
| 2014/0189646 | A1* | 7/2014 | Suryadevara et al. | 717/124 |

OTHER PUBLICATIONS

Muslu et al., "Improving IDE Recommendations by Considering Global Implications of Existing Recommendations," Software Engineering (ICSE), 2012, 34th International Conference Jun. 2-9, 2012, http://ieeexplore.ieee.org/xpl/articleDetails.jsp?tp=&arnumber=6227082&contentType=Conference+Publications&queryText%3DIDE; pp. 1-4.

* cited by examiner

AUTOMATED TEST RUNS IN AN INTEGRATED DEVELOPMENT ENVIRONMENT SYSTEM AND METHOD

BACKGROUND

Automated unit tests may improve software quality, and methodologies such as Test Driven Development (TDD) may be widely used. Some build and development tools may kick off automated unit tests as part of a build process or when an application is launched. Integrated Development Environments (IDEs) may be configured to run builds when files are saved, which may possibly run unit tests as part of the build process. While valuable, such tools may, in some instances, take a long time to provide the necessary feedback to the code developer.

BRIEF SUMMARY OF DISCLOSURE

In one implementation, a method, performed by one or more computing devices, may comprise editing code, by a computing device, via an integrated development environment. The code is determined to be syntactically valid. While editing the code, a subset of automated tests associated with the code is executed in response to determining that the code is syntactically valid. It is determined whether at least one automated test error is detected. The at least one automated test error is reported.

One or more of the following features may be included. Determining that the code is syntactically valid may include determining a pause in receiving input via the integrated development environment. Executing the subset of automated tests may include determining which automated tests to exclude from the subset of automated tests. The subset of automated tests may exclude automated tests running longer than a threshold amount of time. The subset of automated tests may exclude any automated tests not associated with the edited code. Reporting the at least one automated test error within the integrated development environment may include highlighting at least a portion of the code associated with the at least one automated test error within the integrated development environment. Reporting the at least one automated test error within the integrated development environment may include displaying at least a portion of the code associated with the at least one automated test error within the integrated development environment.

In another implementation, a computing system includes a processor and a memory configured to perform operations that may comprise editing code via an integrated development environment. The code is determined to be syntactically valid. While editing the code, a subset of automated tests associated with the code is executed in response to determining that the code is syntactically valid. It is determined whether at least one automated test error is detected. The at least one automated test error is reported.

One or more of the following features may be included. Determining that the code is syntactically valid may include determining a pause in receiving input via the integrated development environment. Executing the subset of automated tests may include determining which automated tests to exclude from the subset of automated tests. The subset of automated tests may exclude automated tests running longer than a threshold amount of time. The subset of automated tests may exclude any automated tests not associated with the edited code. Reporting the at least one automated test error within the integrated development environment may include highlighting at least a portion of the code associated with the at least one automated test error within the integrated development environment. Reporting the at least one automated test error within the integrated development environment may include displaying at least a portion of the code associated with the at least one automated test error within the integrated development environment.

In another implementation, a computer program product resides on a computer readable storage medium that has a plurality of instructions stored on it. When executed by a processor, the instructions cause the processor to perform operations that may comprise editing code via an integrated development environment. The code is determined to be syntactically valid. While editing the code, a subset of automated tests associated with the code is executed in response to determining that the code is syntactically valid. It is determined whether at least one automated test error is detected. The at least one automated test error is reported.

One or more of the following features may be included. Determining that the code is syntactically valid may include determining a pause in receiving input via the integrated development environment. Executing the subset of automated tests may include determining which automated tests to exclude from the subset of automated tests. The subset of automated tests may exclude automated tests running longer than a threshold amount of time. The subset of automated tests may exclude any automated tests not associated with the edited code. Reporting the at least one automated test error within the integrated development environment may include highlighting at least a portion of the code associated with the at least one automated test error within the integrated development environment. Reporting the at least one automated test error within the integrated development environment may include displaying at least a portion of the code associated with the at least one automated test error within the integrated development environment.

The details of one or more implementations are set forth in the accompanying drawings and the description below. Other features and advantages will become apparent from the description, the drawings, and the claims.

DETAILED DESCRIPTION

Figure 1:
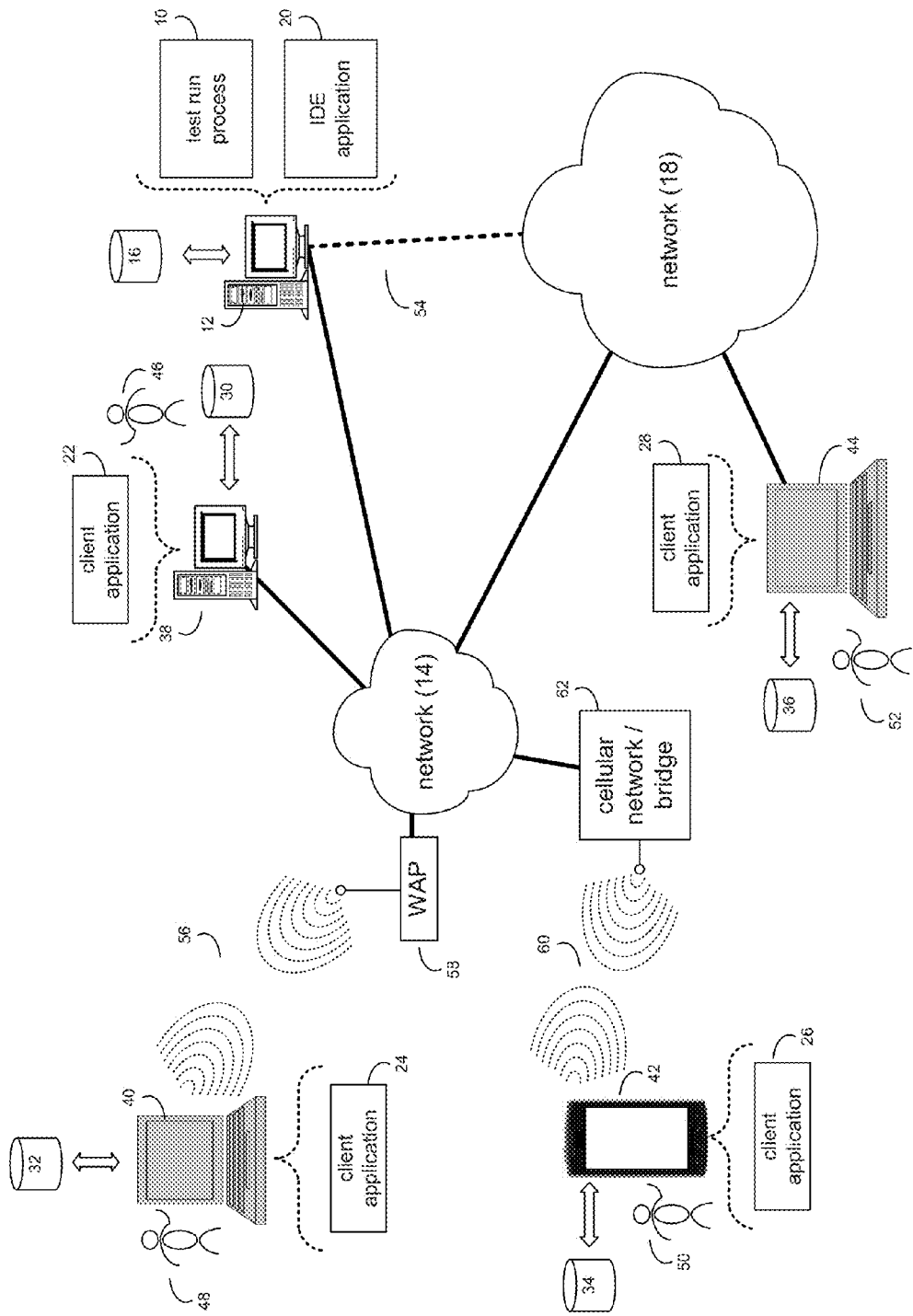
FIG. 1 is an illustrative diagrammatic view of a test run process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown test run process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, test run process 10 may edit code, by a computing device, via an integrated development environment. The code may be determined to be syntactically valid. While editing the code, a subset of automated tests associated with the code may be executed in response to determining that the code is syntactically valid. It may be determined whether at least one automated test error is detected. The at least one automated test error may be reported.

The instruction sets and subroutines of test run process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Test run process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute an Integrated Development Environment (IDE) application (e.g., IDE application 20), examples of which may include, but are not limited to, e.g., a source code editor application, a build automation tool(s) and a debugger application, a compiler application, an interpreter application, a class browser application, an object browser application, a class hierarchy diagram application, or other application that provides comprehensive facilities to computer programmers for software development. Test run process 10 and/or IDE application 20 may be accessed via client applications 22, 24, 26, 28. Test run process 10 may be a stand alone application, or may be an applet/application/script that may interact with and/or be executed within IDE application 20, a component of IDE application 20, and/or one or more of client applications 22, 24, 26, 28. IDE application 20 may be a stand alone application, or may be an applet/application/script that may interact with and/or be executed within test run process 10 and/or one or more of client applications 22, 24, 26, 28. One or more of client applications 22, 24, 26, 28 may be a stand alone application, or may be an applet/application/script that may interact with and/or be executed within test run process 10 and/or IDE application 20. Examples of client applications 22, 24, 26, 28 may include, but are not limited to, e.g., a source code editor application, a build automation tool(s) and a debugger application, a compiler application, an interpreter application, a class browser application, an object browser application, a class hierarchy diagram application, or other application that provides comprehensive facilities to computer programmers for software development, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of test run process 10 (and vice versa). Accordingly, test run process 10 may be a purely server-side application, a purely client-side application, or a hybrid server-side/client-side application that is cooperatively executed by one or more of client applications 22, 24, 26, 28 and/or test run process 10.

One or more of client applications 22, 24, 26, 28 may be configured to effectuate some or all of the functionality of IDE application 20 (and vice versa). Accordingly, IDE application 20 may be a purely server-side application, a purely client-side application, or a hybrid server-side/client-side application that is cooperatively executed by one or more of client applications 22, 24, 26, 28 and/or IDE application 20. As one or more of client applications 22, 24, 26, 28, test run process 10, and IDE application 20, taken singly or in any combination, may effectuate some or all of the same functionality, any description of effectuating such functionality via one or more of client applications 22, 24, 26, 28, test run process 10, IDE application 20, or combination thereof, and any described interaction(s) between one or more of client applications 22, 24, 26, 28, test run process 10, IDE application 20, or combination thereof to effectuate such functionality, should be taken as an example only and not to limit the scope of the disclosure.

Users 46, 48, 50, 52 may access computer 12 and test run process 10 (e.g., using one or more of client electronic devices 38, 40, 42, 44) directly through network 14 or through secondary network 18. Further, computer 12 may be connected to network 14 through secondary network 18, as illustrated with phantom link line 54. Test run process 10 may include one or more user interfaces, such as browsers and textual or graphical user interfaces, through which users 46, 48, 50, 52 may access test run process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
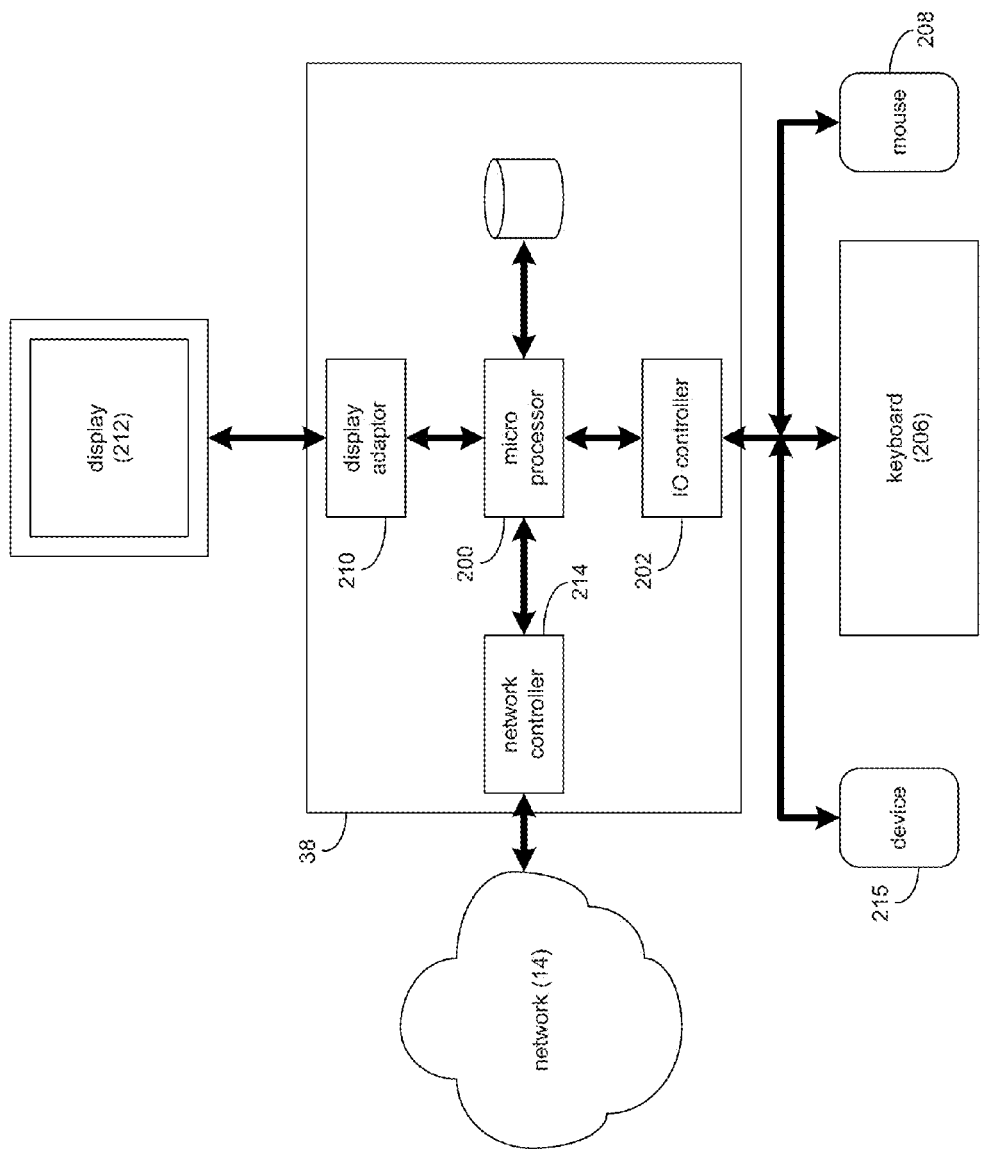
FIG. 2 is a diagrammatic view of a client electronic device of FIG. 1 according to one or more implementations of the present disclosure.
Figure 3:
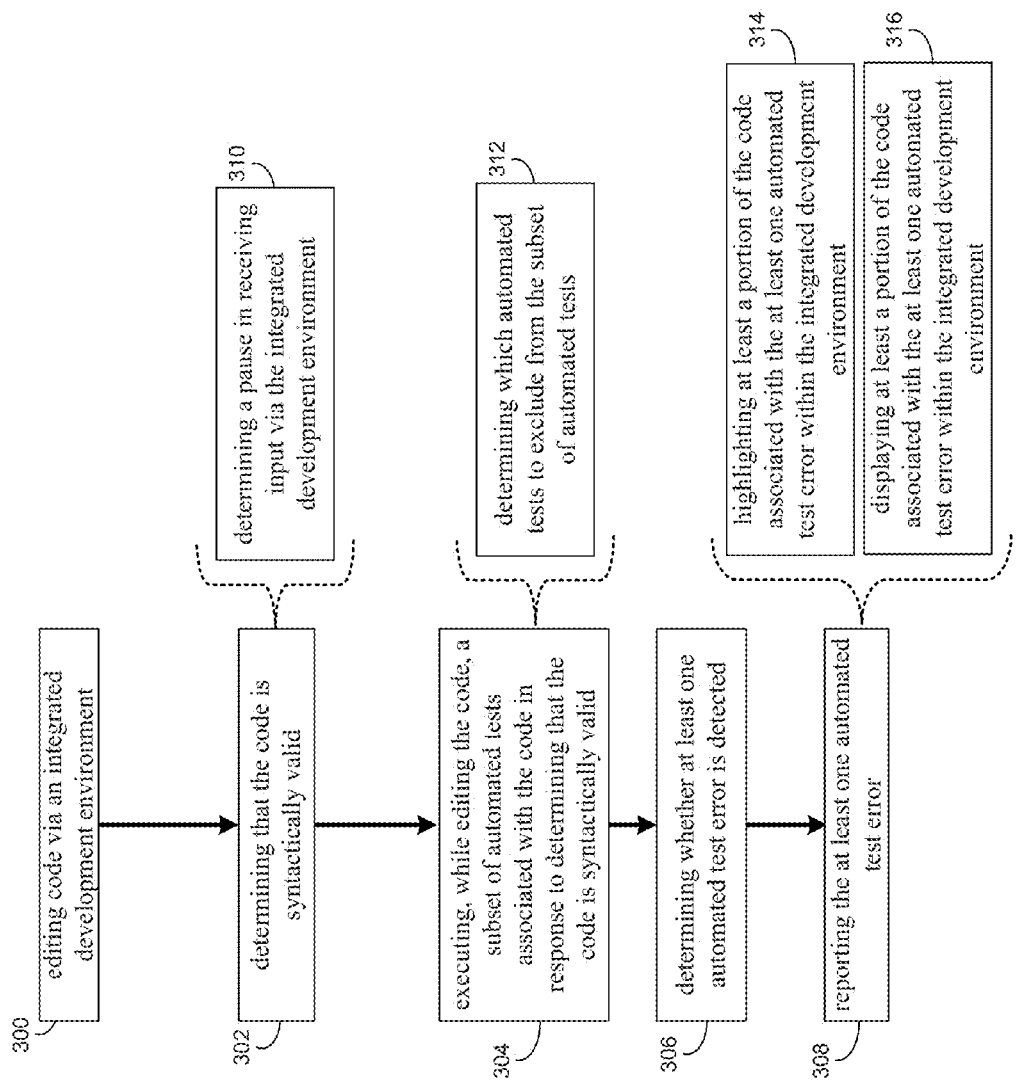
FIG. 3 is an illustrative flowchart of the test run process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, test run process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Test Run Process:

As discussed above and referring also to FIGS. 3-6, test run process 10 may edit 300 code, by a computing device, via an integrated development environment. Test run process 10 may determine 302 that the code is syntactically valid. While editing 300 the code, a subset of automated tests associated with the code may be executed 304 by test run process 10 in response to determining 302 that the code is syntactically valid. Test run process 10 may determine 306 whether at least one automated test error is detected. Test run process 10 may report 308 the at least one automated test error.

Figure 4:
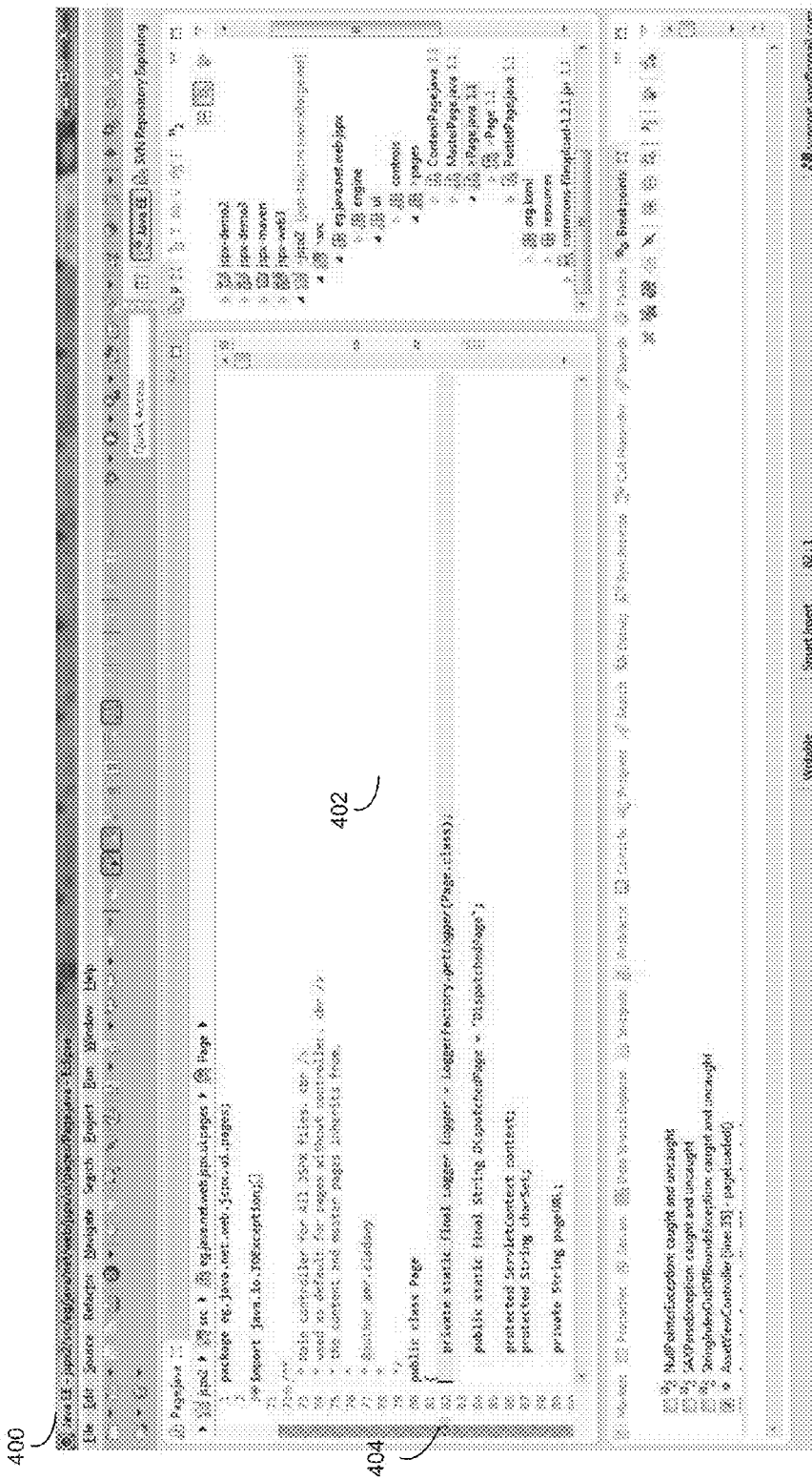
FIG. 4 is an illustrative diagrammatic view of a screen image displayed by the test run process of FIG. 1 according to one or more implementations of the present disclosure.
Figure 5:
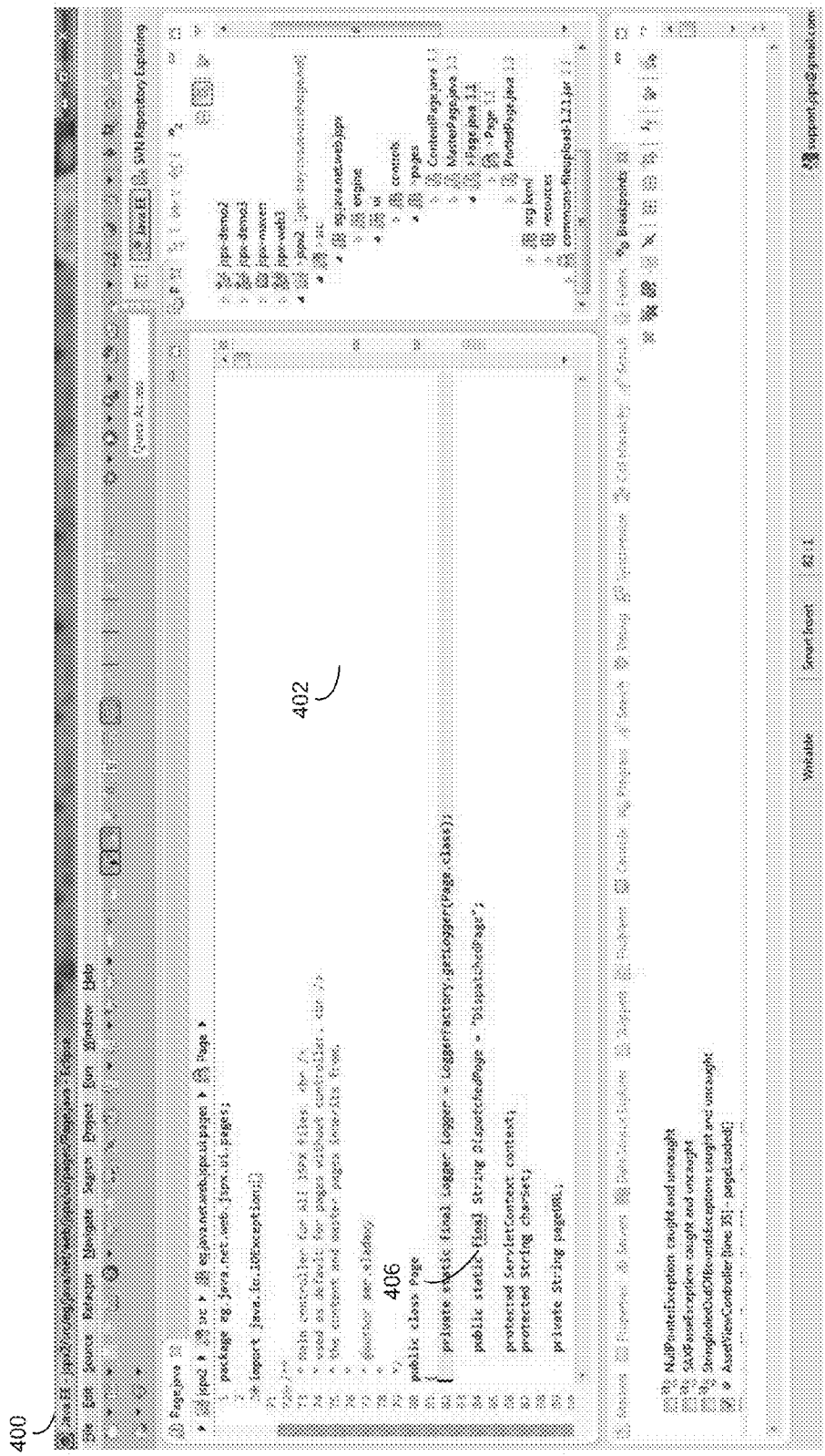
FIG. 5 is an illustrative diagrammatic view of a screen image displayed by the test run process of FIG. 1 according to one or more implementations of the present disclosure.
Figure 6:
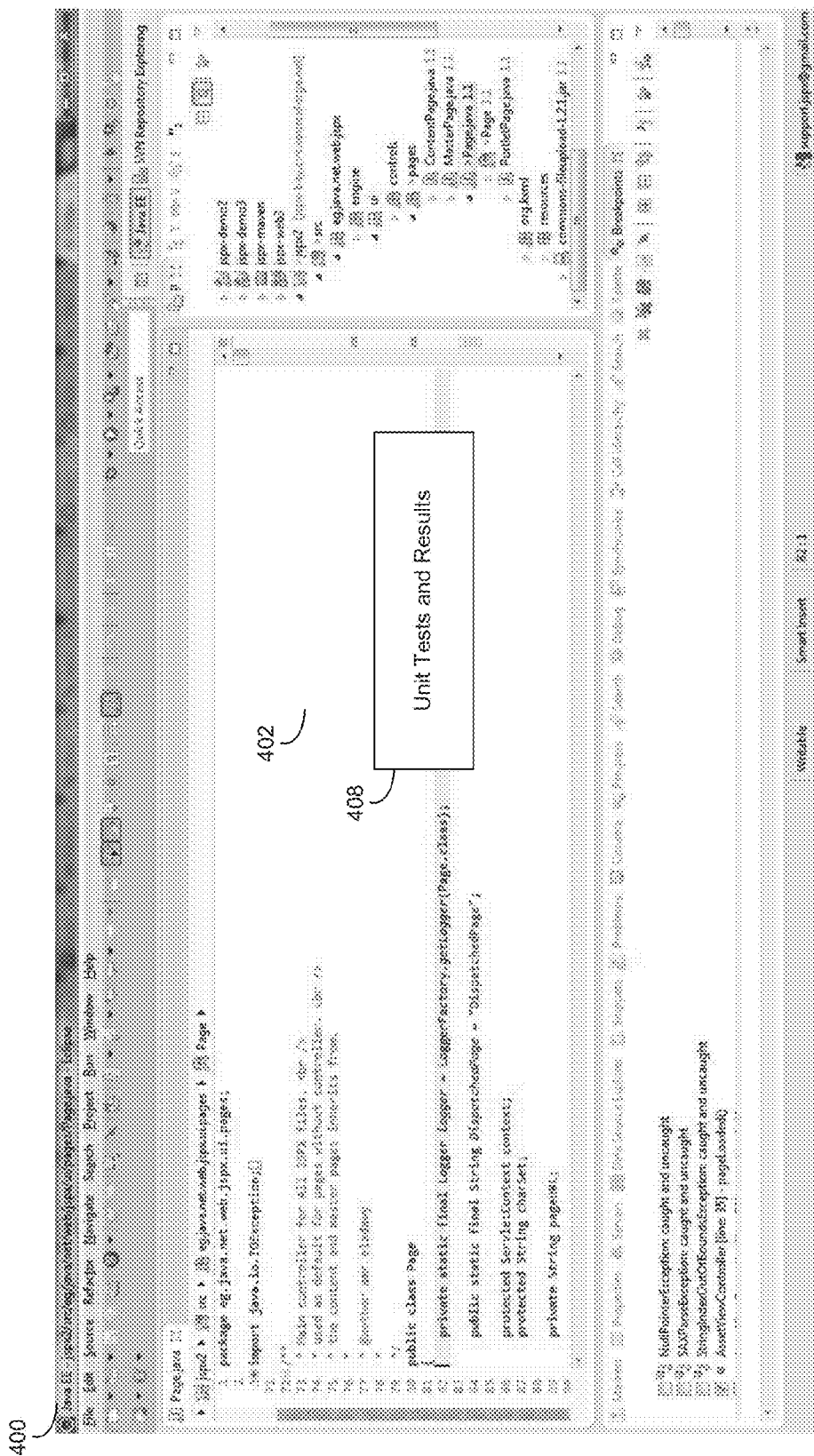
FIG. 6 is an illustrative diagrammatic view of a screen image displayed by the test run process of FIG. 1 according to one or more implementations of the present disclosure.

In some implementations, unlike some traditional integrated development environments (IDEs) that may require saving and running a build (and often requiring an entire test suite to run) before obtaining unit test feedback about code being developed, test run process 10 may enable "immediate" unit test feedback, which may show test errors unobtrusively, but in context, within a source code editor of an IDE. For example, a user (e.g., user 46) may through test run process 10 edit 300 code, by a computing device (e.g., client electronic device 38), via an integrated development environment (IDE). The IDE may be provided via IDE application 20. An example user interface 400 that may be associated with IDE application 20 is shown at FIG. 4. Example code (e.g., code 402) is shown via user interface 400, which may be edited 300 via test run process 10.

In some implementations, and continuing with the above example, test run process 10 may determine 302 that the code is syntactically valid. The various types and examples of syntax errors, as well as the techniques to determine valid/invalid syntax, are known to those skilled in the art. In some implementations, determining 302 that the code is syntactically valid may include test run process 10 determining 310 a pause in receiving input via the integrated development environment. For example, user 46 (via test run process 10, IDE application 20, client application 22, or combination thereof) may use, e.g., keyboard 206, to edit code 402. Occasionally, user 46 may, for whatever reason, pause to contemplate how to further edit code 402. In the example, user 46 may cease to use keyboard 206 during such contemplation, which may result in a pause of, e.g., at least 1 second, before IDE application 20 receives additional input from user 46 via keyboard 206 for further editing. In response to determining 310 the pause in receiving an input, test run process 10 may determine 302 if the code that has been input is syntactically valid. It will be appreciated that a 1 second threshold for being considered a pause in receiving input should be taken as an example only and not to limit the scope of the present disclosure. Additionally, it will be appreciated that other devices, such as mouse 208, may be used to determine 310 the pause in receiving input.

In some implementations, while editing 300 code 402, a subset of automated tests associated with the code may be executed 304 by test run process 10 in response to determining 302 that code 402 is syntactically valid. For instance, assume for example purposes only that, as discussed above, while editing 300 code 402, user 46 pauses to contemplate how to further edit code 402, ceases to use keyboard 206 during such contemplation, which results in a pause of, e.g., at least 1 second, before IDE application 20 receives additional input from user 46 via keyboard 206 for further editing. In the example, test run process 10 may execute 304 or run a subset of automated tests in the background after the pause (e.g., without saving and running a build, without running an entire test suite, or combination thereof). That is, for example, in response to determining 310 the pause, test run process 10 may determine 302 that code 402 is syntactically valid. Further, in response to determining 302 that code 402 is syntactically valid, test run process 10 may further execute 304 the subset of automated tests. In some implementations, the subset of automated tests associated with the code may be executed 304 by test run process 10 in response to determining 302 that code 402 is syntactically valid (e.g., which determination may be based upon, at least in part, an occurrence other than a pause). Further, in some implementations, test run process 10 may periodically execute 304 the subset of automated tests during predetermined intervals of time (e.g., every 5 seconds).

In some implementations, executing 304 the subset of automated tests may include test run process 10 determining 312 which automated tests to exclude from the subset of automated tests. For example, to find the best candidate tests to run on-the-fly in the subset of automated tests, IDE application 20 may collect data about one or more automated unit tests, e.g., when a test suite is run, which may include how long each test takes to run and what code it covers. Finding the best tests to run may be beneficial for performance, since the tests may be run often (e.g., after each pause, after every other pause, etc.).

For instance, in some implementations, the subset of automated tests may exclude automated tests running longer than a threshold amount of time. For example, tests from a particular test suite that are intensive or long-running may be excluded from being executed as part of the subset of automated tests to improve performance (e.g., the time needed to completely execute the subset of automated tests).

As another example, in some implementations, the subset of automated tests may exclude any automated tests not associated with the edited code. For instance, tests from a particular test suite that may not cover the code currently being edited may be excluded from being executed as part of the subset of automated tests, which may also improve performance. It will be appreciated that additional tests may be excluded using other criteria, as well as through a user preference (not shown) in IDE application 20. Additionally, in some implementations, additional tests may be excluded directly in the unit test source code using, e.g., Java annotations or similar.

In some implementations, test run process 10 may determine 306 whether at least one automated test error is detected. For instance, the automated test error may be detected using similar techniques employed by traditional IDEs when running an entire test suite and determining an automated test error.

In some implementations, test run process 10 may report 308 the at least one automated test error. For example, reporting 308 the at least one automated test error within the integrated development environment may include test run process 10 highlighting 314 at least a portion of the code associated with the at least one automated test error within the integrated development environment. As used herein, highlighting 314 may include any type of annotation (e.g., changing background colors of the source code, underlining the source code, italicizing the source code, bolding the source code, or using an error marker in the editor margin and/or beside the filename, etc.). For example, and referring at least to FIG. 4, assume for example purposes only that test run process 10 determines 306 that an automated test error associated with the code currently being edited 300 contains an error. In the example, test run process 10 may render an example error marker (e.g., error marker 404) in the source code editor margin. In another example, and referring at least to FIG. 5, test run process 10 may render in user interface 400 a colored underline (e.g., red underline 406) in the source code itself. In some implementations, highlighting 314 at least a portion of the code as failing unit tests may include utilizing a different visual style of annotation than may be utilized to indicate syntax errors (e.g., when both indications of code failing unit test and indications of a syntax error within the code are both displayed using the same highlighting technique). For instance, test run process 10 may use a different color for indicating portions of code associated with the failing unit test and portions of code associated with the syntax error if each error type is underlined, or may use a different image as the error marker if each error type uses error markers.

In some implementations, reporting 308 the at least one automated test error within the integrated development environment may include test run process 10 displaying 316 at least a portion of code 402 associated with the at least one automated test error within the integrated development environment. For instance, and referring also to FIG. 6, test run process 10 may display 316 the most relevant unit tests and their results, e.g., in a separate view (e.g., object 408) within IDE application 20. Object 408 may include, e.g., a pop-up window, a separate window within IDE application 20, or otherwise.

In some implementations, using a pointing device, such as mouse 208, to hover over the error may cause IDE application 20 to render more detail about the error and information about the unit test. For instance, assume for example purposes only that the unit test includes a Javadoc comment describing what is being tested. In the example, IDE application 20 may render that level of detail in addition to any error information. In some implementations, IDE application 20 may provide a gesture (e.g., icon or other object) to navigate to the test source code or start debugging in, e.g., one click.

In some implementations, test run process 10 may function better with test cases that may be capable of running independently (i.e., tests that do not require that one test case run before the next). In some implementations, test run process 10 may function with tests that require a running application if, e.g., the IDE supports hot swapping of code.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   editing code, by a computing device, via an integrated development environment;
   determining, by the computing device, whether the code is syntactically valid in response to the computing device determining a pause in receiving input for editing the code via the integrated development environment;
   executing, while editing the code, a subset of automated tests associated with the code, wherein the subset of automated tests associated with the code is executed in the background during the editing of the code without executing an entire test suite of tests after the pause in receiving input for editing the code and in response to determining that the code is syntactically valid;
   determining whether at least one automated test error is detected;
   analyzing the automated tests to determine a runtime associated with each of the automated tests and to determine a portion of the code associated with each of the automated tests;
   determining one or more automated tests to exclude from the subset of automated tests including one or more automated tests of the subset of automated tests with a runtime running longer than a threshold amount of time and one or more automated tests not associated with the code currently being edited; and
   reporting the at least one automated test error, including highlighting at least a portion of the code associated with the at least one automated test error within the integrated development environment using a first visual style and highlighting at least a portion of the code associated with a syntax error using a different visual style.

2. The computer-implemented method of claim 1, wherein reporting the at least one automated test error within the integrated development environment includes displaying at least a portion of the code associated with the at least one automated test error within the integrated development environment.

3. The computer-implemented method of claim 1, wherein determining one or more automated tests to exclude from the subset of automated tests includes receiving a user preference of one or more automated tests to exclude from the subset of automated tests.

4. The computer-implemented method of claim 1, wherein each of the automated tests of the subset of automated tests is capable of running independently.

5. The computer-implemented method of claim 1, wherein the subset of automated tests is executed after every other pause in receiving input for editing the code.

6. A computer program product residing on a non-transitory computer readable storage medium having a plurality of instructions stored thereon which, when executed by a processor, cause the processor to perform operations comprising:
   editing code via an integrated development environment;
   determining, by the processor, whether the code is syntactically valid in response to the processor determining a pause in receiving input for editing the code via the integrated development environment;
   executing, while editing the code, a subset of automated tests associated with the code, wherein the subset of automated tests associated with the code is executed in the background during the editing of the code without executing an entire test suite of tests after the pause in receiving input for editing the code and in response to determining that the code is syntactically valid;
   determining whether at least one automated test error is detected;
   analyzing the automated tests to determine a runtime associated with each of the automated tests and to determine a portion of the code associated with each of the automated tests;
   determining one or more automated tests to exclude from the subset of automated tests including one or more automated tests of the subset of automated tests with a runtime running longer than a threshold amount of time and one or more automated tests not associated with the code currently being edited; and
   reporting the at least one automated test error, including highlighting at least a portion of the code associated with the at least one automated test error within the integrated development environment using a first visual style and highlighting at least a portion of the code associated with a syntax error using a different visual style.

7. The computer program product of claim 6, wherein reporting the at least one automated test error within the integrated development environment includes displaying at least a portion of the code associated with the at least one automated test error within the integrated development environment.

8. The computer program product of claim 6, wherein determining one or more automated tests to exclude from the subset of automated tests includes receiving a user preference of one or more automated tests to exclude from the subset of automated tests.

9. The computer program product of claim 6, wherein each of the automated tests of the subset of automated tests is capable of running independently.

10. The computer program product of claim 6, wherein the subset of automated tests is executed after every other pause in receiving input for editing the code.

11. A computing system including a processor and a memory configured to perform operations comprising:
    editing code via an integrated development environment;
    determining, by the computing system, whether the code is syntactically valid in response to the computing system determining a pause in receiving input for editing the code via the integrated development environment;
    executing, while editing the code, a subset of automated tests associated with the code, wherein the subset of automated tests associated with the code is executed in the background during the editing of the code without executing an entire test suite of tests after the pause in receiving input for editing the code and in response to determining that the code is syntactically valid;

determining whether at least one automated test error is detected;

analyzing the automated tests to determine a runtime associated with each of the automated tests and to determine a portion of the code associated with each of the automated tests;

determining one or more automated tests to exclude from the subset of automated tests including one or more automated tests of the subset of automated tests running longer than a threshold amount of time and one or more automated tests not associated with the code currently being edited; and reporting the at least one automated test error, including highlighting at least a portion of the code associated with the at least one automated test error within the integrated development environment using a first visual style and highlighting at least a portion of the code associated with a syntax error using a different visual style.

12. The computing system of claim 11, wherein determining one or more automated tests to exclude from the subset of automated tests includes receiving a user preference of one or more automated tests to exclude from the subset of automated tests.

13. The computing system of claim 11, wherein each of the automated tests of the subset of automated tests is capable of running independently.

14. The computing system of claim 11, wherein the subset of automated tests is executed after every other pause in receiving input for editing the code.

* * * * *